Sept. 2, 1958　　　　　　G. HATCH　　　　　　2,850,616
HOT PLATE AND UTENSIL DETACHABLY CONNECTED
MECHANICALLY BY A THERMOSTATIC PROBE
Filed July 1, 1957　　　　　　　　　　　　4 Sheets-Sheet 1

INVENTOR.
GORDON HATCH
BY
Wheeler, Wheeler & Wheeler
ATTORNEYS

Sept. 2, 1958
G. HATCH
2,850,616
HOT PLATE AND UTENSIL DETACHABLY CONNECTED
MECHANICALLY BY A THERMOSTATIC PROBE
Filed July 1, 1957
4 Sheets-Sheet 2
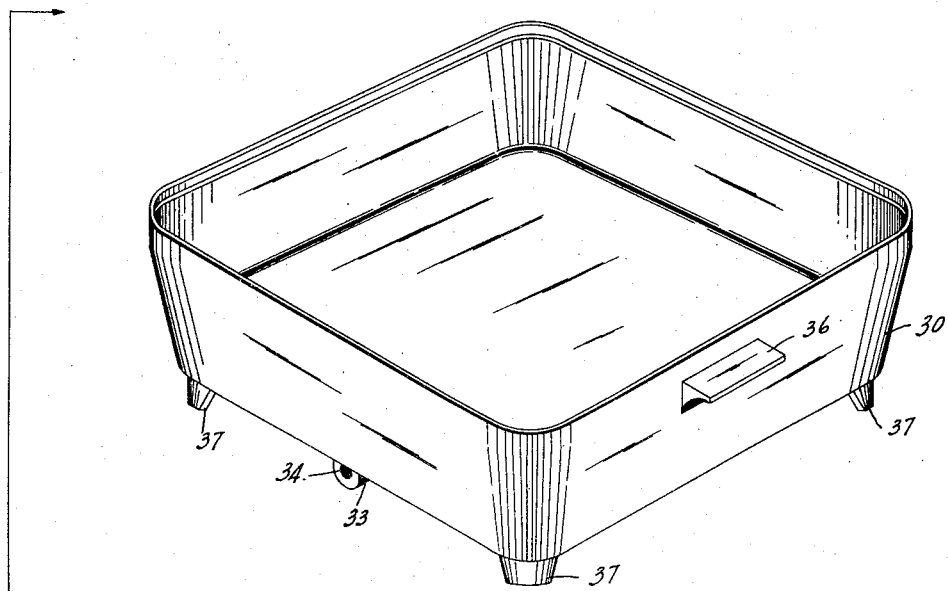
Fig. 2
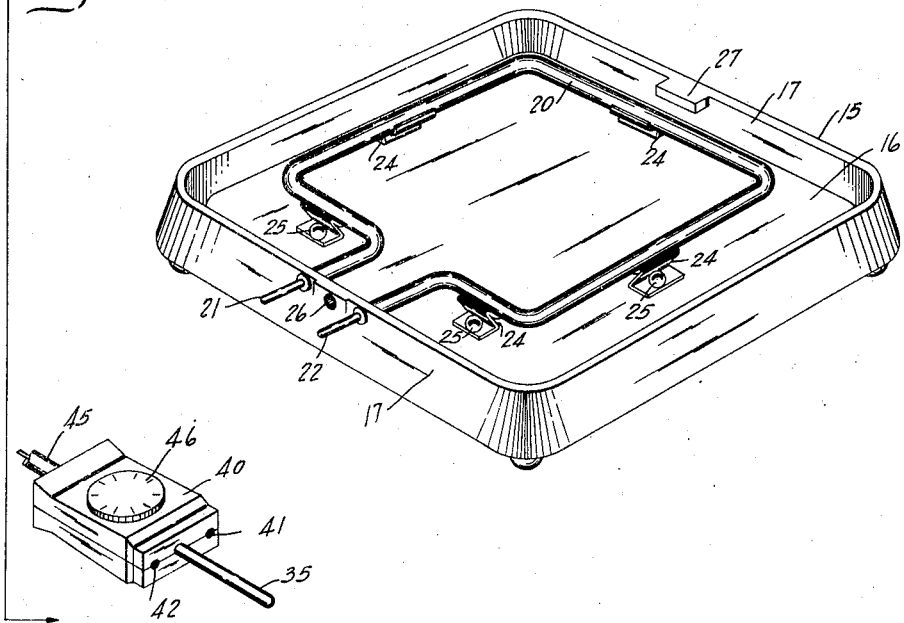
INVENTOR.
GORDON HATCH
BY
Wheeler, Wheeler & Wheeler
ATTORNEYS INVENTOR.
GORDON HATCH
BY
Wheeler, Wheeler & Wheeler
ATTORNEYS Sept. 2, 1958 G. HATCH 2,850,616
HOT PLATE AND UTENSIL DETACHABLY CONNECTED
MECHANICALLY BY A THERMOSTATIC PROBE
Filed July 1, 1957 4 Sheets-Sheet 4

INVENTOR.
GORDON HATCH
BY
Wheeler, Wheeler Wheeler
ATTORNEYS

United States Patent Office 2,850,616
Patented Sept. 2, 1958

2,850,616

HOT PLATE AND UTENSIL DETACHABLY CONNECTED MECHANICALLY BY A THERMOSTATIC PROBE

Gordon Hatch, Milwaukee, Wis.

Application July 1, 1957, Serial No. 669,320

15 Claims. (Cl. 219—43)

This invention relates to a thermostatically controlled cooker comprising a hot plate and utensil detachably connected mechanically by a thermostatic probe.

The hot plate comprises a base supporting an electrical heating element for which the base provides terminal prongs. A utensil for the material to be cooked or heated is mechanically interlocked detachably with the base. In a preferred embodiment, the interlock involves a tongue and groove connection between the base and utensil at the side opposite the prongs, the utensil and base having registering openings adapted to receive a thermostatic probe on the side on which the prongs are located. When the probe is in place, it mechanically connects the utensil to the base at only side only, but only by withdrawing the probe to free the utensil from the base at the front is it possible to manipulate the utensil in such a way as to disengage the tongue and groove connection betweeen the utensil and the base at the rear.

The thermostatic probe contains means for regulating the temperature of the utensil. In the preferred arrangement, the probe extends into a socket of the utensil and is therefore directly responsive to utensil temperatures as distinguished from those of the base. The probe may be provided unitarily with an electric receptacle which receives the prongs supplying current to the heating element of the base, this being the preferred embodiment. However, I have also disclosed an alternative embodiment in which the receptacle which supplies current to the prongs is mechanically distinct from the thermostat and probe, the thermostat being merely connected in series with one of the prongs.

In the drawings:

Fig. 2 shows the utensil and base in perspective in relatively disassociated positions, the probe and electric receptacle unit being illustrated in a position to expose the opening into which the electrical prongs of the base are received when the parts are assembled.

The hot plate 15 has the form of a shallow pan comprising a bottom 16 and side wall 17, the side wall being continued below the bottom as skirt 18.

Figure 8:
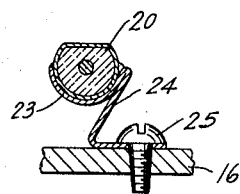
Fig. 8 is an enlarged fragmentary detail view showing one way of mounting the heating element on the base of the hot plate.

Disposed in any manner within the pan portion of the base is heating element 20 which is preferably of the sheathed electrical resistance type. The ends terminate in electrical coupling prongs 21, 22 which project from the front of the hot plate wall 17. To support the sheath of the heating element from the bottom 16 of the hot plate base, I may weld the saddle portions 23 of clips 24 to the sheath at suitable intervals, using self-tapping screws 25 to anchor these clips to the bottom 16 as shown in Fig. 8.

In the preferred embodiment of the invention, the electrical connections of the prongs 21 and 22 are spaced at opposite sides of an aperture 26 at the front of the hot plate. Opposite this aperture at the rear of the hot plate is a tongue 27. Both the apertured portion of the hot plate and the tongue portion thereof contribute to the mechanical connection with the hot plate of the utensil 30 for the material to be heated.

Figure 5:
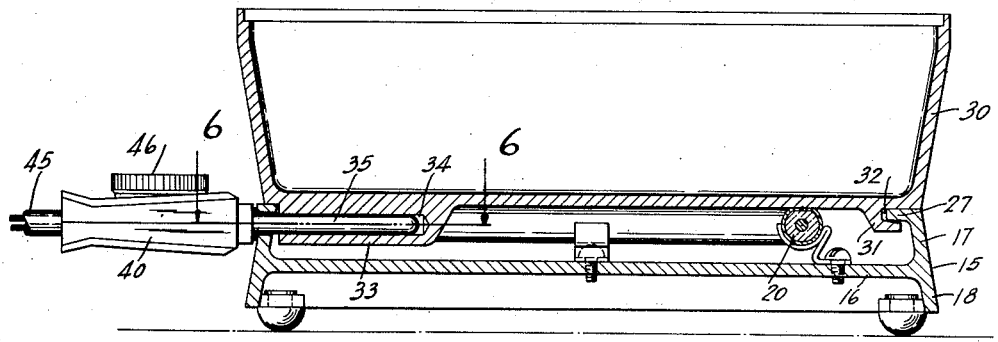
Fig. 5 is a view taken in longitudinal section on the line 5—5 of Fig. 4.
Figure 7:
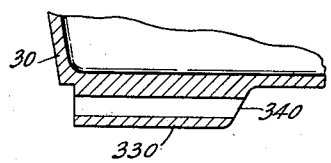
Fig. 7 is a fragmentary detail view in a plan similar to Fig. 5 showing a modified probe-receiving socket of the utensil.

Utensil 30 is provided on its under side with a downwardly and rearwardly projecting flange 31 which forms a groove at 32 in which tongue 27 of the hot plate is detachably engageable. At the side of the utensil opposite the flange 31, the utensil has a downwardly projecting boss 33 which provides a socket 34 registering with the hole 26 in the front of the hot plate when the parts are assembled as shown in Fig. 5. The socket 34 may be a blind socket, closed at its inner end, as shown in Fig. 5, or it may open through the boss 330 to the rear thereof, as shown at 340 in Fig. 7.

Figure 1:
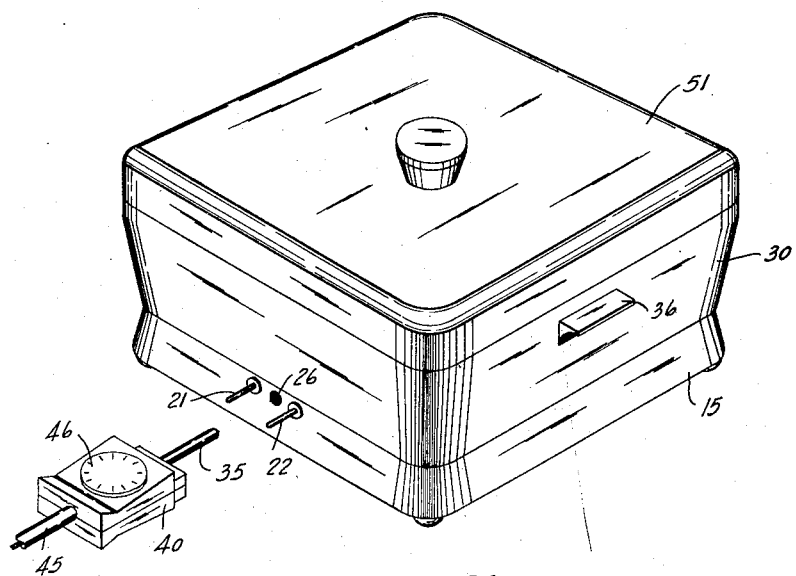
Fig. 1 is a view in perspective of a utensil and base constructed in accordance with the invention, the probe being illustrated in a withdrawn position.
Figure 3:
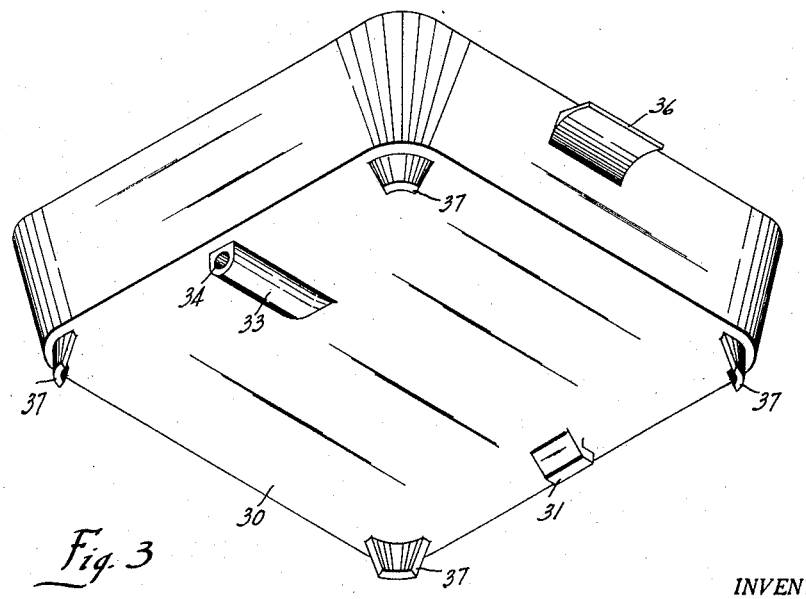
Fig. 3 is a bottom perspective view of the utensil.
Figure 4:
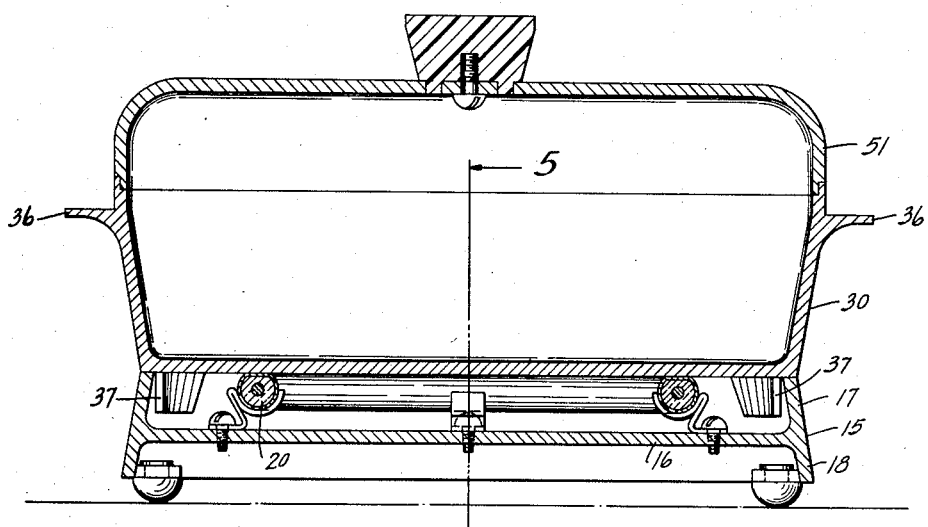
Fig. 4 is a view taken through the assembled base and utensil in transverse section.
Figure 6:
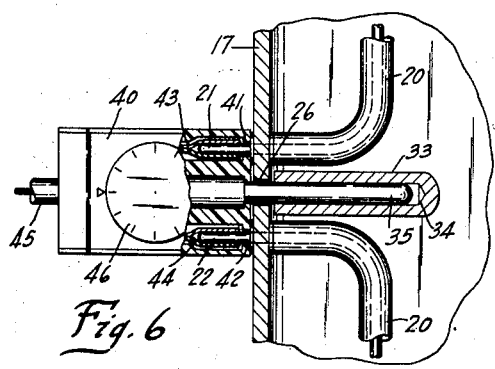
Fig. 6 is an enlarged detail view taken in horizontal section on the line 6—6 of Fig. 5.

When a probe 35 is inserted through the hole 26 into the socket 34, as shown in Figs. 5 and 6, the utensil 30 is mechanically connected to the hot plate 15 so that the parts may be handled unitarily. Lifting the utensil by means of such handles as those shown at 36 will carry the hot plate or base with the utensil as if the two parts were in permanent connection. Yet upon the withdrawal of the probe 35, the utensil can readily be manipulated with respect to the hot plate base to free the tongue and groove connection at the back of the utensil and base, thereby permitting the utensil to be withdrawn completely from the hot plate either for washing or for carrying its contents to a dining table or elsewhere. The feet 37 of the utensil are receivable within the side wall 17 of the hot plate as shown in Fig. 4. They project below the utensil sufficiently so that the boss 33 and clamps 31 do not contact any surface upon which the feet are supported when the utensil is free of the hot plate.

In the preferred embodiment of the invention, the probe 35 is in unitary connection with an electrical receptacle housing 40 which has openings at 41, 42 to receive the prongs 21, 22 which are fixed to the hot plate. Within the receptacle housing 40 and registering with the openings 41, 42 therein are the electrical contacts 43, 44 with which the prongs 21, 22 are engaged when inserted as shown in Fig. 6. The contacts 43, 44 are supplied with current by a cord 45 in the usual manner. The receptacle housing 40 as illustrated contains a thermostat of which the probe 35 is a part.

It will be understood that the thermostat is connected in series between the current source, here represented by the cord 45, and one of the contacts 43 or 44, the thermostat including a switch controlled by temperature fluctuations, subject to the regulation of a dial 46 which may be rotated to determine the temperature at which the thermostat will act to interrupt current to the hot plate.

The probe as shown is a commercial device. It is not involved in the present invention with the exception of the fact that the present invention teaches how the probe 35 may be used to effect a mechanical connection between the utensil and the hot plate while, at the same time, responding almost entirely to utensil temperatures as distinguished from those of the hot plate.

Figure 9:
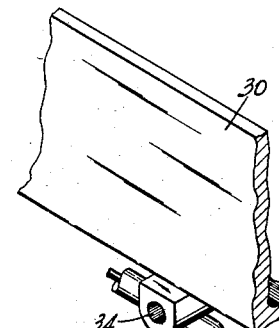
Fig. 9 is a framentary detail view in perspective showing in relatively separated positions portions of a modified utensil and a modified hot plate.
Figure 10:
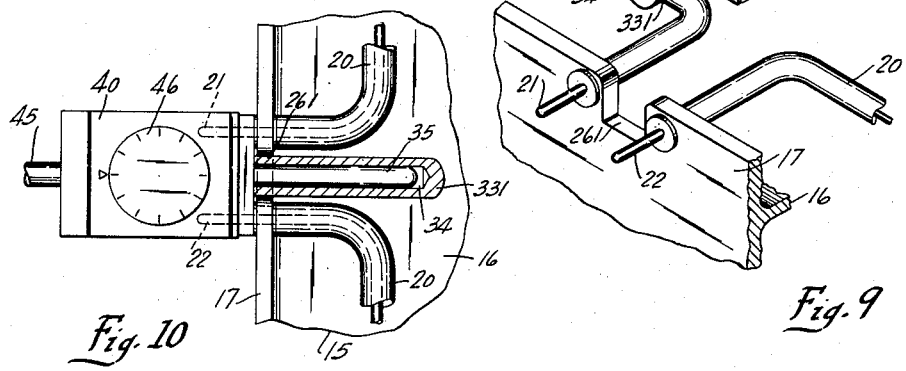
Fig. 10 is a view in horizontal section through the parts of Fig. 9 in their assembled positions.

In the modified embodiment shown in Figs. 9 and 10, the hot plate wall 17 has a notch at 261 instead of the hole shown at 26 as previously described. The complementary boss 331 of utensil 30 is extended forwardly from the front of the utensil to be received into the notch 261. Thus the probe 35 in and of itself is incapable of mechanically connecting the hot plate and the utensil, being received directly into the boss 331 without passing through any anchorage portion of the hot plate. However, if the thermostatic receptacle unit as here shown is used, the mechanical connection between the utensil and hot plate is effected through the prongs 21, 22 and the housing 40 and the probe 35. While this construction is not preferred because of the mechanical stress imposed on the prongs, it does provide a mechanical connection which is readily made by inserting the probe and engaging the prongs in the receptacle and is readily broken by simply withdrawing the unit.

Figure 11:
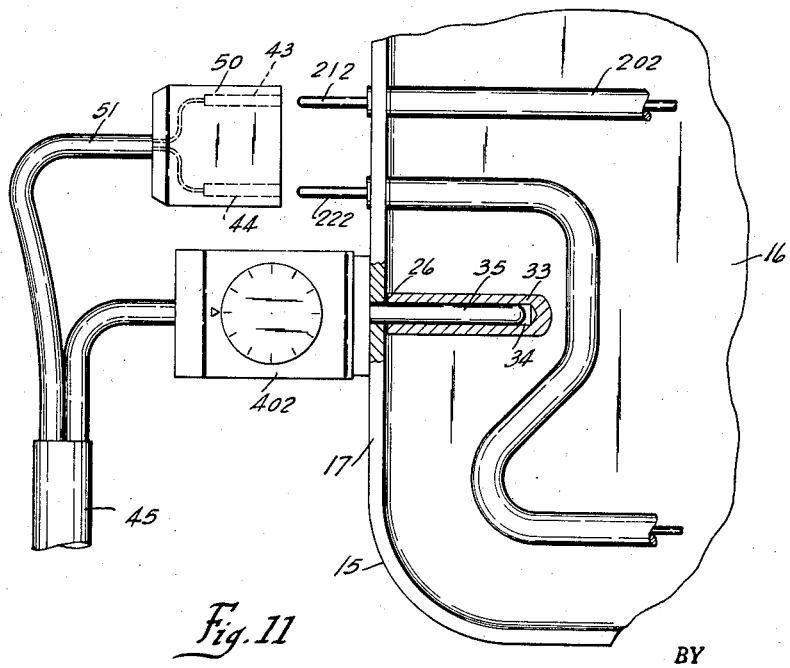
Fig. 11 is a view partly in plan and partly in section showing fragmentarily the modified base and hot plate utensil connection.

Fig. 11 shows the hot plate provided with a heating element 202 having prongs 212 and 222 which are offset from the probe-receiving opening 26. The thermostat case 402 has a probe 35 projecting from it for thermostatic purposes exactly as above described and this probe is used to effect mechanical connection between the utensil and the hot plate exactly as above described. However, the series connection between the thermostat and the contacts 33, 34 in the separate receptacle member 50 has to be effected through a branch cord 51 with which the supply cord 45 is provided.

The mechanical connection effected when the probe 35 is in place is just as sturdy as that above described, the disadvantage of this arrangement being the necessity of making the electrical connection to the prongs 21 and 22 separately, through separate manipulation of the receptacle member 50.

I have shown the utensil 30 provide with a cover 51 which, of course, is optional. I have also shown the legs 37 of the utensil in lateral engagement internally with the sidewall 17 of the hot plate. This also is a nonessential feature, although it is greatly to be desired because it contributes to the physical unity of the utensil and hot plate when the parts are connected by the probe.

My purpose in disclosing embodiments less desirable than the preferred construction first described is to indicate, without limitation, that a number of changes can be made in mechanical structure or design without departing from the broad concept of this invention.

I claim:

1. The combination with a hot plate member and a utensil member having an interfitting top and base respectively, of means comprising a thermostatic probe for locking the hot plate member and utensil member in unitary connection, said plate member comprising a heater, and said probe comprising a thermostat responsive to heater temperature.

2. The device of claim 1 in which said members have registering openings in which the probe is removably engaged.

3. The device of claim 1 in which said means further comprises electrical connection prongs with which one of said members is provided, the hot plate member having an electrical resistance adapted to be supplied with current through said prongs.

4. The device of claim 3 in which the hot plate member is provided with said prongs and the thermostatic probe has receptacles spaced to receive said prongs and in unitary connection with the probe.

5. The combination with hot plate and utensil members having mechanical interlocking means at corresponding sides and releasable by manipulation of one of said members with respect to the other, the said members being provided opposite the interlocking means with registering apertures, of a probe in an operative position in said apertures and locking said members together against such manipulation.

6. The device of claim 5 in further combination with a thermostatic unit from which said probe projects, the said unit and hot plate member having prong and receptacle means electrically and mechanically engaged when the probe enters the apertures and released when the probe is withdrawn from the apertures, the hot plate including a heating element provided with current through said prong and receptacle means and controlled by said thermostat.

7. The device of claim 6 in which the utensil is provided with a depending boss having a socket constituting the receptacle aperture aforesaid and in which a major part of the length of the probe is engaged.

8. The device of claim 7 in which the socket is blind within the boss.

9. The device of claim 7 in which the socket opens through the boss.

10. The device of claim 7 in which the utensil is provided with feet extending to a level at least as low as that of the boss whereby the utensil will stand steadily on said feet when removed from the hot plate.

11. The device of claim 10 in which the hot plate has means abutting said feet for positioning the utensil against lateral displacement respecting the hot plate.

12. The combination with a hot plate member comprising a base provided with a circuitously extending heating element and with an upstanding wall laterally enclosing the heating element and provided at opposite sides of the base with a mechanical interlock means and with an aperture, of a utensil member having a bottom portion fitting said base and provided with mechanical interlock means detachably engaged with the mechanical interlock means of the base, the utensil having a depending boss provided with an aperture registering with the aperture of the wall of the base, and a locking element detachably positioned within the registering apertures of the base wall and the utensil boss for holding the utensil against manipulation respecting the base in a direction to free the respective mechanical interlock means aforesaid.

13. The device of claim 12 in which said element comprises a thermostat probe, in further combination with a thermostat housing from which the probe projects and means for providing a thermostatically controlled detachable connection to the heating element of the hot plate member.

14. The device of claim 13 in which said last mentioned means comprises plug-in prong and receptacle mechanisms located at the side of the hot plate in a position offset from the probe.

15. The device of claim 13 in which said last mentioned means comprises prong and receptacle members at opposite sides of the probe element, a pair of said members being fixed to the hot plate and a complementary pair of said members being fixed to said thermostat housing to be manipulated unitarily with said probe.

References Cited in the file of this patent

UNITED STATES PATENTS

| | | |
|---|---|---|
| 910,479 | Andrews | Jan. 19, 1909 |
| 1,006,104 | Kuhn et al. | Oct. 17, 1911 |
| 1,046,859 | Roe | Dec. 10, 1912 |
| 2,234,547 | Bazzoni | Mar. 11, 1941 |
| 2,369,932 | Allen | Feb. 20, 1945 |
| 2,801,325 | Pearce | July 30, 1957 |

FOREIGN PATENTS

| | | |
|---|---|---|
| 827,854 | Germany | Jan. 14, 1952 |